United States Patent [19]

Sekikawa

[11] Patent Number: 5,602,453
[45] Date of Patent: Feb. 11, 1997

[54] COORDINATE SYSTEM DISPLAY GUIDE FOR A NUMERICAL CONTROL APPARATUS

[75] Inventor: Katsuhide Sekikawa, Aichi, Japan

[73] Assignee: Mitsubishi Denki Kabushiki Kaisha, Tokyo, Japan

[21] Appl. No.: 21,117

[22] Filed: Feb. 23, 1993

[30] Foreign Application Priority Data

Feb. 27, 1992 [JP] Japan .................. 4-040995

[51] Int. Cl.⁶ .................................................. G06F 15/20
[52] U.S. Cl. ................... 318/570; 318/571; 364/474.25; 364/474.27; 395/119
[58] Field of Search .................... 318/560–632; 364/474.01–474.36, 170, 188, 520, 192, 521, 190, 191, 473; 395/161, 109, 119, 99, 157

[56] References Cited

U.S. PATENT DOCUMENTS

| | | | |
|---|---|---|---|
| 4,527,155 | 7/1985 | Yamaki et al. | 340/727 |
| 4,722,045 | 1/1988 | Kishi et al. | 364/171 |
| 4,782,438 | 11/1988 | Mizukado et al. | 364/191 |
| 5,006,977 | 4/1991 | Seki et al. | 364/192 |
| 5,021,966 | 6/1991 | Seki et al. | 364/474.26 |
| 5,043,865 | 8/1991 | Seki et al. | 364/192 |
| 5,063,517 | 11/1991 | Seki et al. | 364/474.22 |
| 5,065,332 | 11/1991 | Seki et al. | 364/474.22 |
| 5,067,087 | 11/1991 | Seki et al. | 364/474.24 |
| 5,075,873 | 12/1991 | Seki et al. | 395/140 |
| 5,095,439 | 3/1992 | Seki et al. | 364/474.24 |
| 5,138,557 | 8/1992 | Seki et al. | 364/474.25 |
| 5,159,558 | 10/1992 | Seki et al. | 364/474.27 |
| 5,160,977 | 11/1992 | Utsumi | 356/376 |
| 5,172,327 | 12/1992 | Miyata et al. | 364/474.21 |
| 5,177,690 | 1/1993 | Seki et al. | 364/474.27 |
| 5,204,824 | 4/1993 | Fujimaki | 364/474.03 |
| 5,237,647 | 8/1993 | Roberts et al. | 395/119 |
| 5,305,427 | 4/1994 | Nagata | 395/94 |
| 5,325,470 | 6/1994 | Sumino et al. | 395/121 |
| 5,347,624 | 9/1994 | Takanashi et al. | 395/157 |

FOREIGN PATENT DOCUMENTS

| | | |
|---|---|---|
| 62-35911 | 2/1987 | Japan . |
| 2-220097 | 9/1990 | Japan . |
| 2-236704 | 9/1990 | Japan . |
| 3-98170 | 4/1991 | Japan . |

*Primary Examiner*—Paul Ip
*Attorney, Agent, or Firm*—Sughrue, Mion, Zinn, Macpeak & Seas

[57] ABSTRACT

A numerical control apparatus for controlling a cutting machine for cutting a workpiece according to a predetermined tool path wherein the tool path is defined relative to a coordinate system by a cutting program. The numerical control apparatus includes circuitry for generating data representing a coordinate system guide and a graphic display device for displaying the coordinate system guide so that a program designer can determine whether the tool path is defined relative to a desired coordinate system.

26 Claims, 12 Drawing Sheets

DISPLAY SECTION FLOWCHART

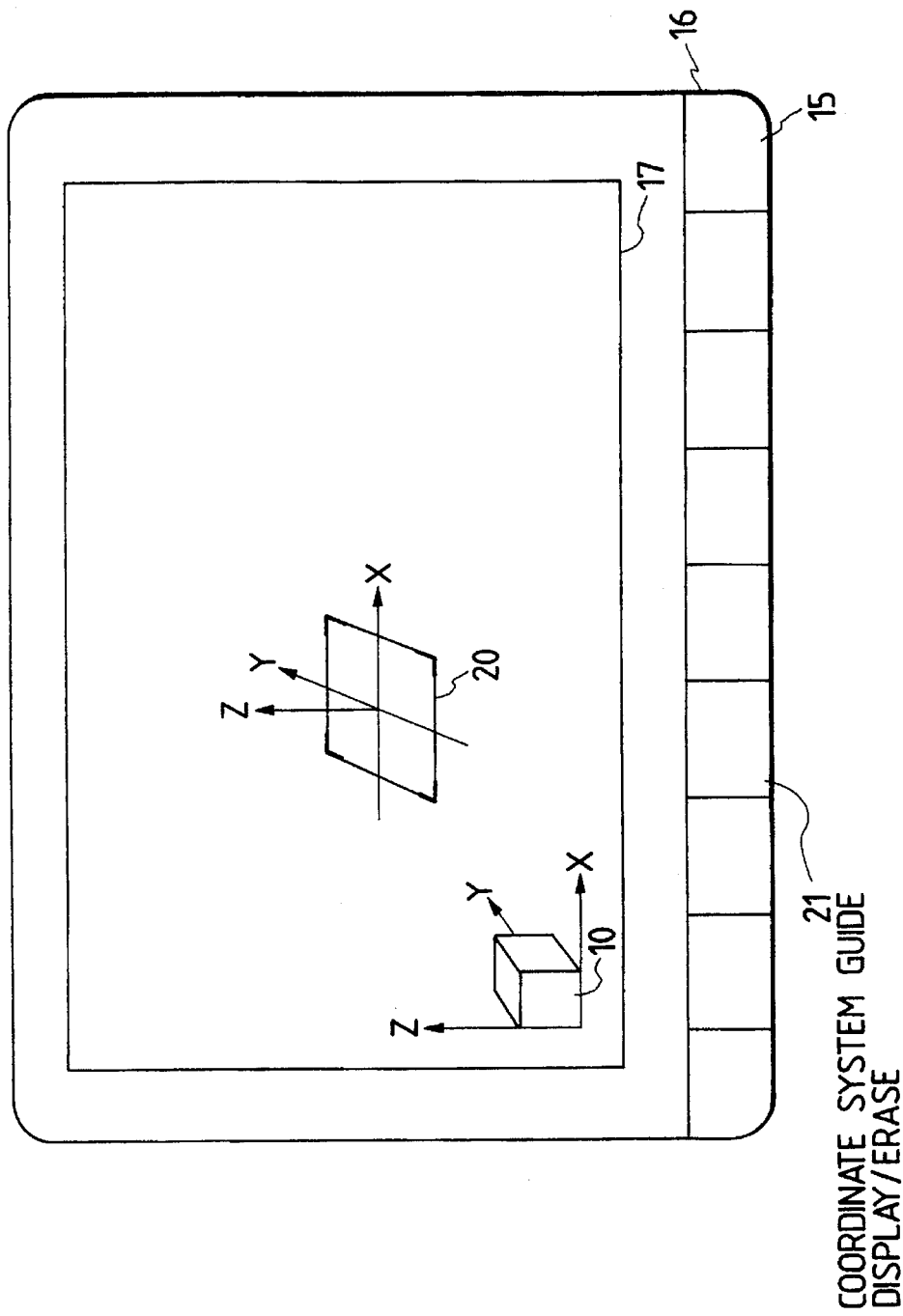

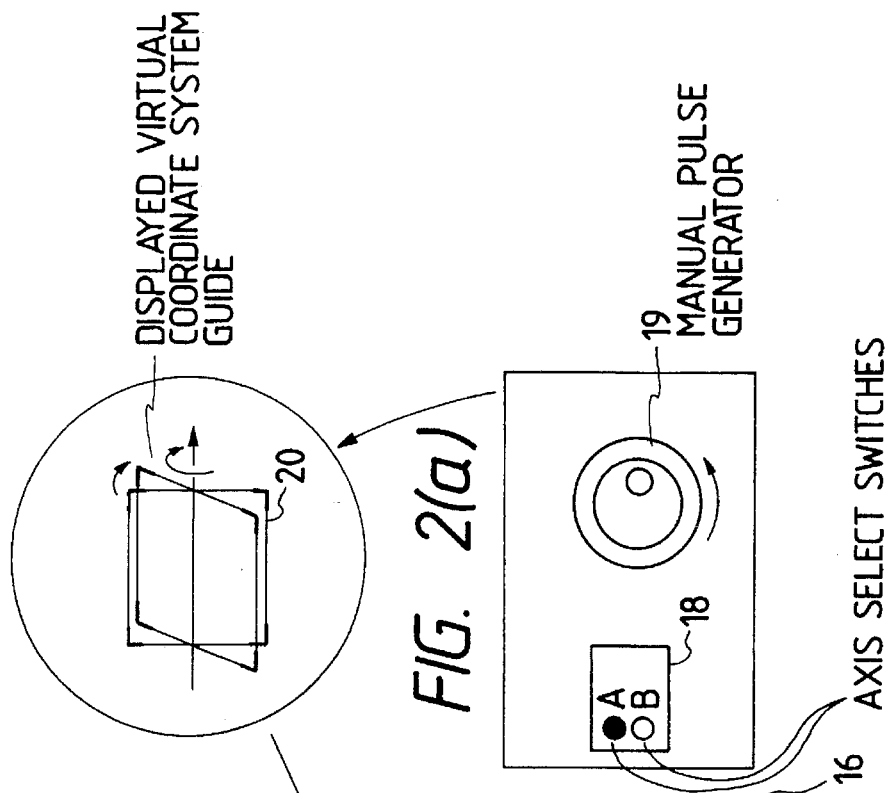
FIG. 2(a)
FIG. 2(b)
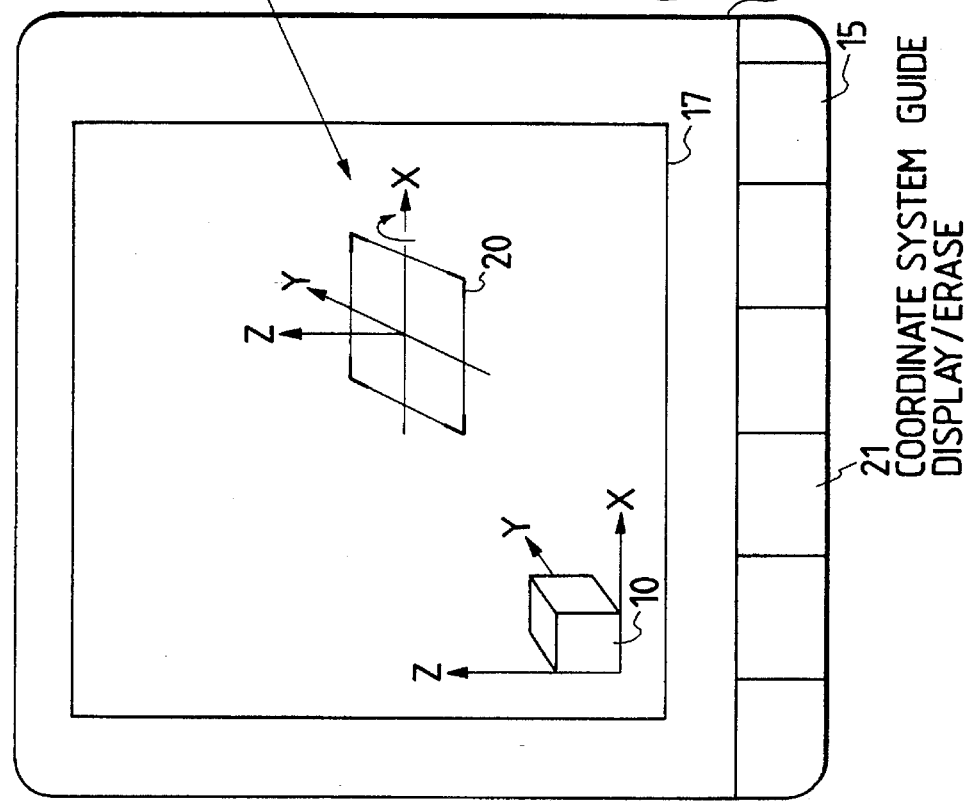
FIG. 2(c)

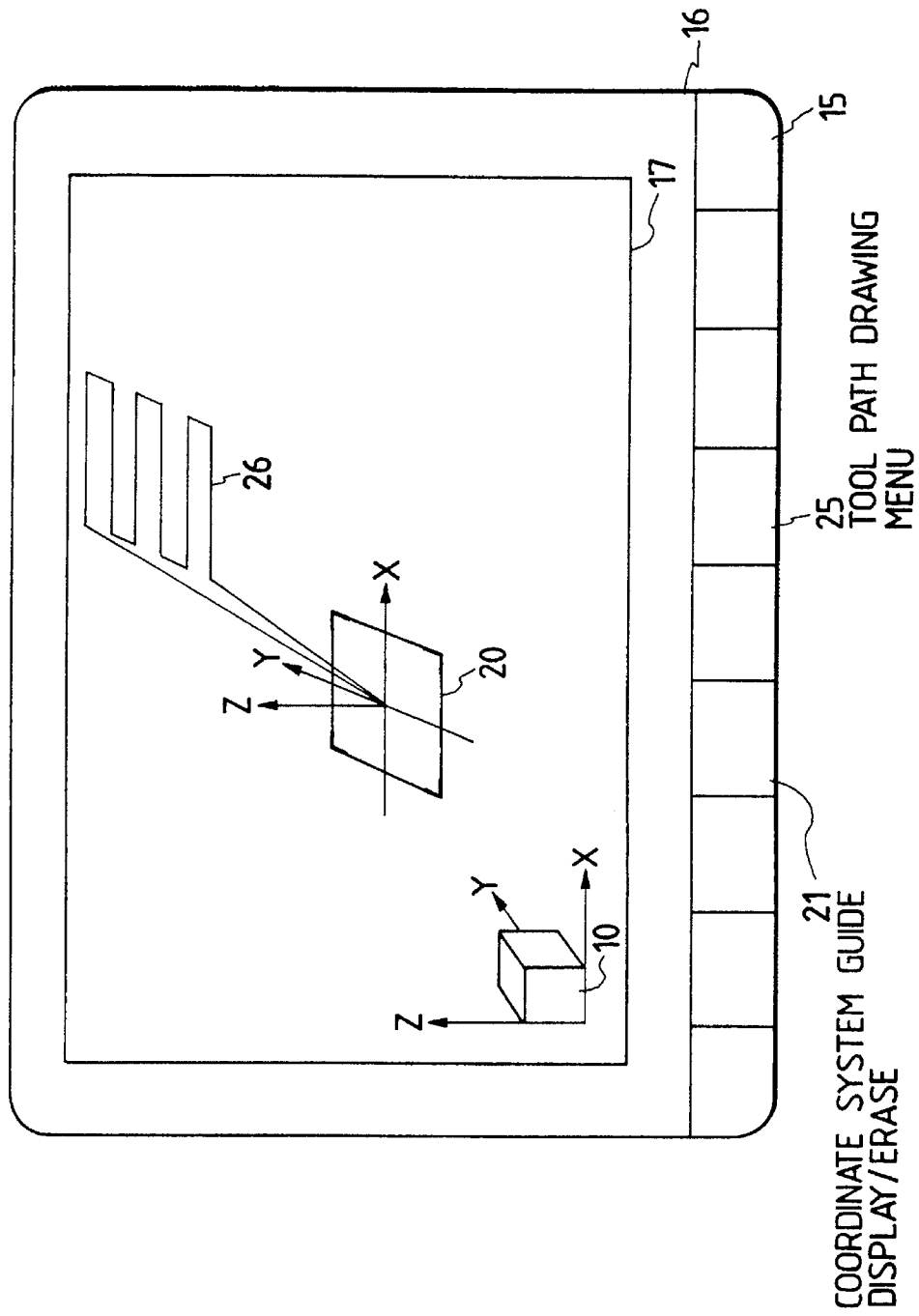

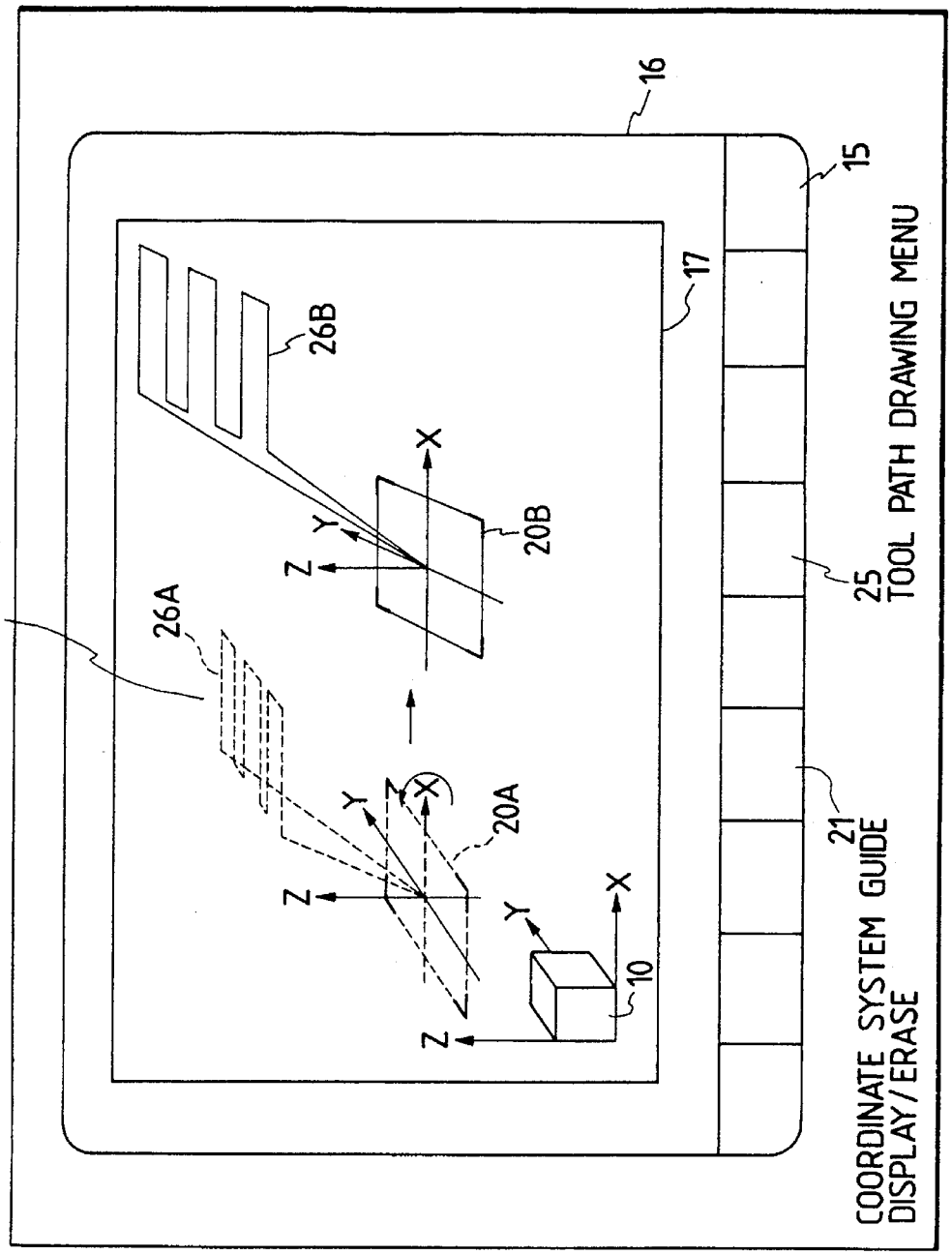

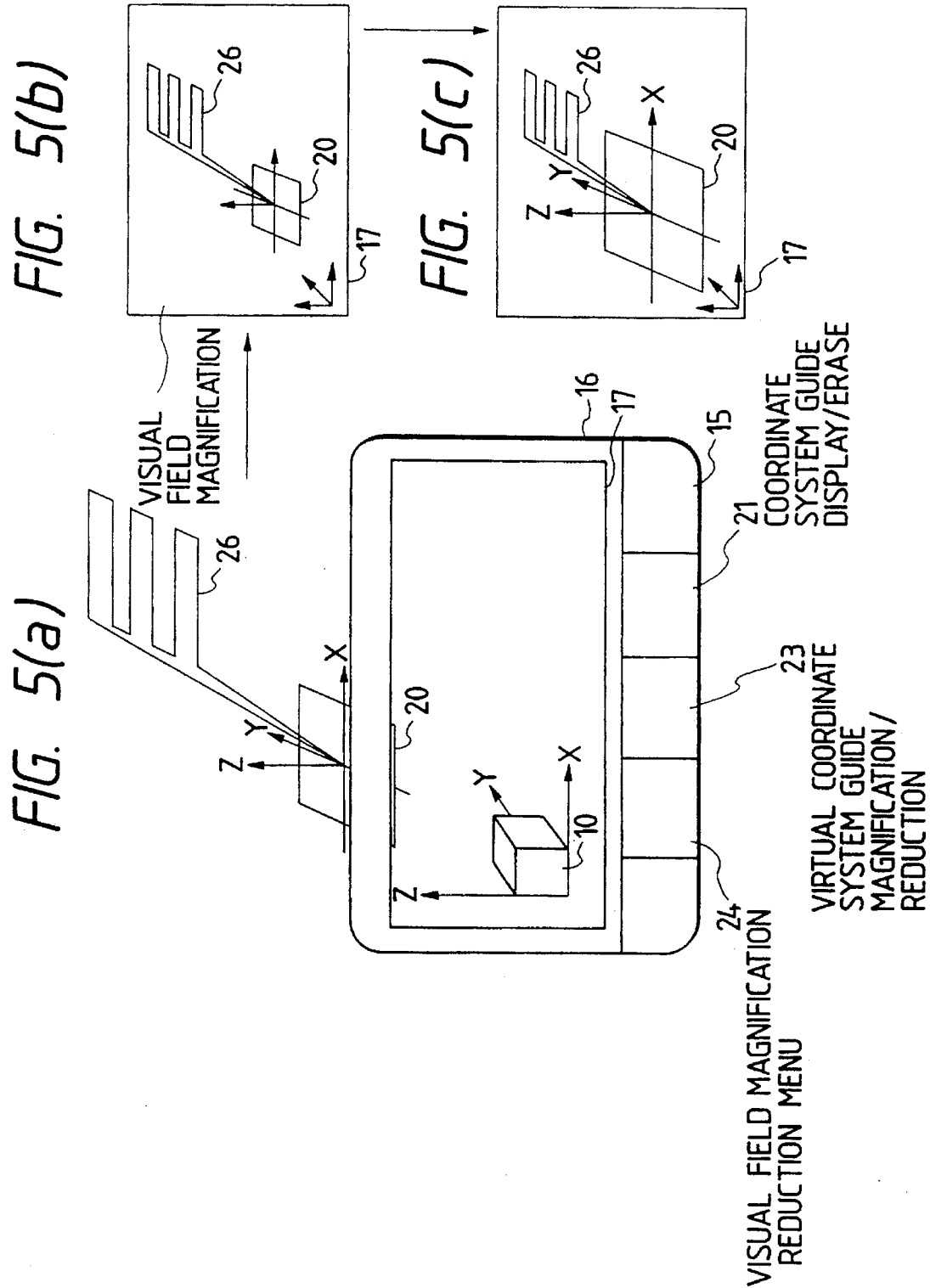

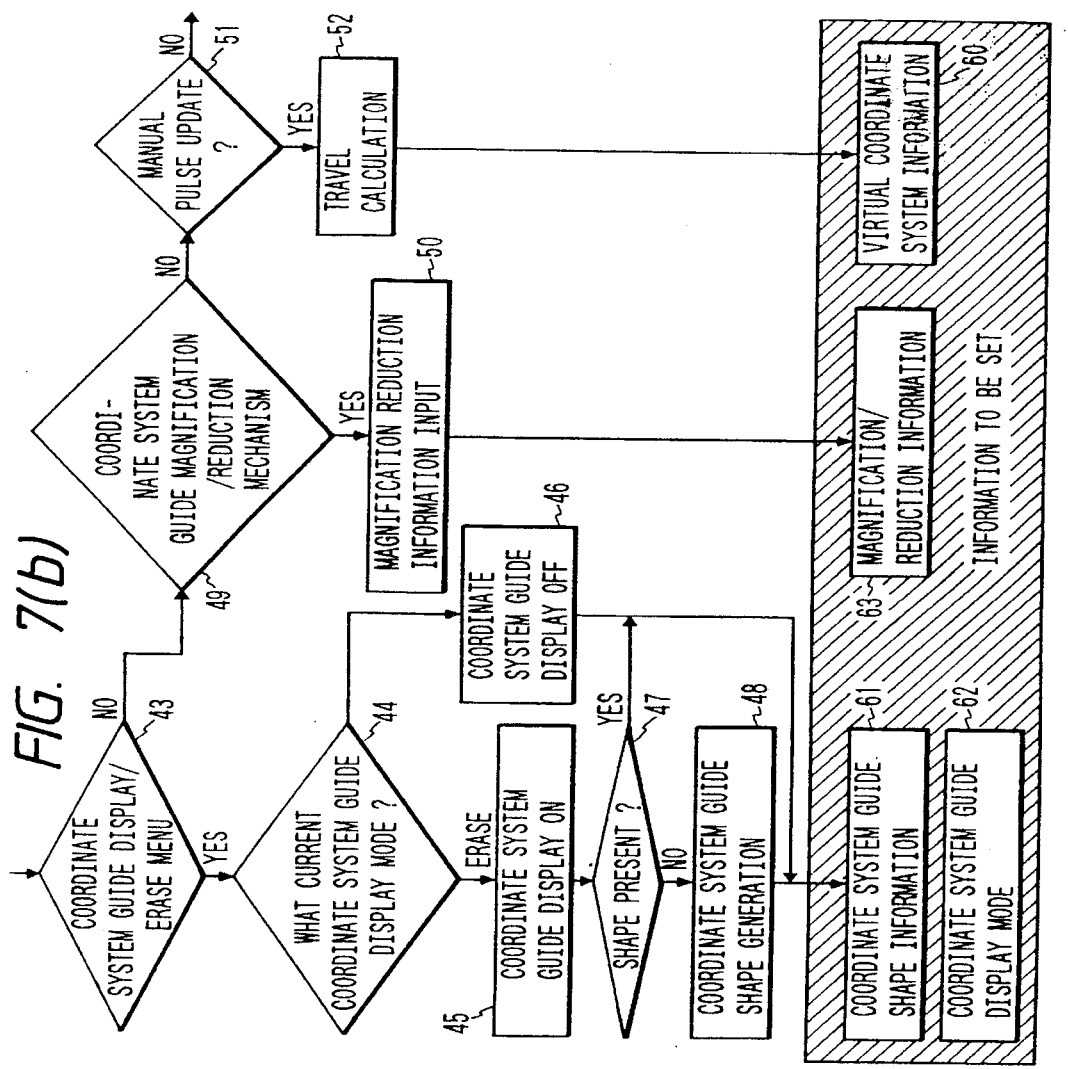

DISPLAY SECTION FLOWCHART

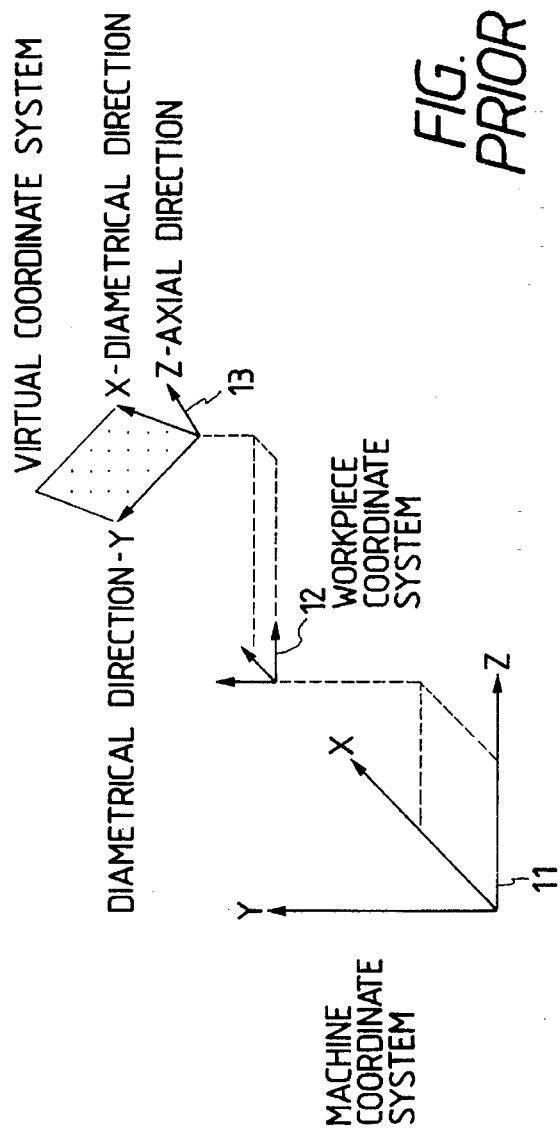
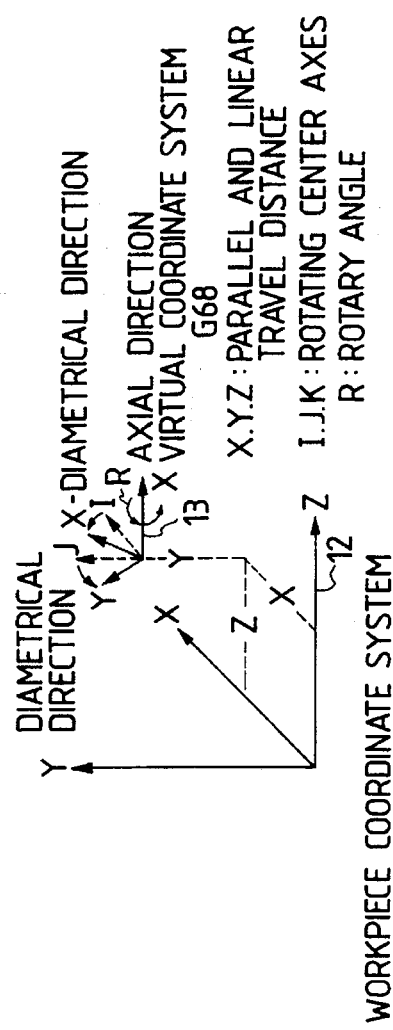
FIG. 10(a) PRIOR ART
FIG. 10(b) PRIOR ART

COORDINATE SYSTEM DISPLAY GUIDE FOR A NUMERICAL CONTROL APPARATUS

BACKGROUND OF THE INVENTION

The present invention relates, in general, to a numerical control apparatus and more particularly to a coordinate system display guide of the numerical control apparatus for displaying relative movements between different programmed virtual coordinate systems and tool paths.

A numerical control apparatus controls the positioning of a tool relative to a workpiece using numerical values to cut or machine the workpiece, even when the workpiece is of complex shape.

A conventional numerical control apparatus will be described with reference to FIGS. 10–12.

FIG. 10(a) shows a machine coordinate system 11, which represents a specific machine position, a workpiece coordinate system 12, which represents the coordinate system of a workpiece, and a virtual (local) coordinate system 13, which designates a coordinate system relative to the workpiece coordinate system 12. The cutting program of the numerical control apparatus, which defines the cutting or machining operation of a workpiece, is written with respect to the workpiece coordinate system 12. The virtual coordinate system 13 may be set (relative to the workpiece coordinate system 12) to enable the easier design of a cutting or partial-cutting program.

FIG. 10(b) shows translation parameters X, Y, and Z, which represent a position in a virtual coordinate system relative to the workpiece coordinate system 12, rotary axis command parameters I, J, and K corresponding to the translation parameters X, Y, and Z, respectively, and a rotary angle parameter R. By programming a shape in the workpiece coordinate system X, Y, registering the shape as a submodule, setting a virtual coordinate system 13, and then executing the shape submodule, the shape will be created relative to a specified optional plane. FIG. 10(b) further illustrates motions x, y, and z and the rotation of the rotary angle R relative to the Z axis (K).

FIG. 11 illustrates a graphic display device of a numerical control apparatus, which displays a tool path 26 defined by a cutting program for a set virtual coordinate system 13 and a cube 10 which serves as a visual reference point. The graphic display device also includes a menu frame 15, a screen frame 16, a display frame 17, and a tool path drawing menu 25. In FIG. 11, regardless of the virtual coordinate system 13 currently set only the tool path 26 that has already been converted with respect to the set virtual coordinate system 13 is displayed. That is, in conventional numerical control apparatus, only the tool path 26 that has been converted with respect to the set virtual coordinate system 13 is displayed. Although the program designer may attempt to check the virtual coordinate system 13 in the cutting program by variously changing the visual reference point, the designer cannot determine whether the virtual coordinate system 13 is being set as intended. This is a problem with the conventional numerical control apparatus.

In FIG. 12, a tool path 26A is displayed when a virtual coordinate system 13 is set a predetermined linear distance, defined by the X, Y, Z parameters, relative to the workpiece coordinate system 12. FIG. 12 also shows a second tool path 26B relative to a second virtual coordinate system 13', which is rotated about the X axis of the virtual coordinate system 13 of the tool path 26A. The tool paths 26A and 26B are shown from within the same visual field. However, the set virtual coordinate system 13 or 13' is not displayed so that the program designer cannot determine whether the desired virtual coordinate system has been set. This too is a problem.

Although objects depicted by solid lines and broken lines are shown in FIG. 12, only objects designated by solid lines are actually displayed on the graphic display device. Similarly, in FIG. 12, both tool paths 26A and 26B are shown together to facilitate a better understanding of the present invention, but in practice only one of the tool paths 26A and 26B are displayed.

SUMMARY OF THE INVENTION

Accordingly, it is an object of the present invention to overcome the above and other disadvantages in the prior art by providing a graphics display device for a numerical control apparatus which allows a currently set virtual coordinate system to be viewed to allow a program designer to determine whether the virtual coordinate system has been set as intended.

In accordance with the above and other objects, the present invention provides a numerical control apparatus for controlling a cutting machine for cutting a workpiece according to a predetermined tool path, the tool path being defined relative to a coordinate system by a cutting program, the numerical control apparatus including guide means for generating data representing a coordinate system guide, and a graphic display device for displaying the coordinate system guide so that a program designer can determine whether the tool path is defined relative to a desired coordinate system.

Further in accordance with the above objects, the present invention provides a method of controlling a cutting machine for cutting a workpiece according to a predetermined tool path in a numerical control apparatus, the tool path being defined relative to a coordinate system by a cutting program. The method includes the steps of selecting whether to display/erase a coordinate system guide, determining, if the coordinate system guide is to be displayed, whether data representing the coordinate system guide is stored in memory, generating, if the data is not stored in memory, coordinate system guide data comprising virtual coordinate system guide shape information, and displaying the coordinate system guide based on the generated virtual coordinate system guide shape information.

BRIEF DESCRIPTION OF THE DRAWINGS

FIG. 1 illustrates a coordinate system guide display of a numerical control apparatus in accordance with the present invention;

FIG. 2 illustrates an input device of the coordinate system guide display of FIG. 1;

FIG. 3 illustrates the coordinate system guide display and a tool path in accordance with the present invention;

FIG. 4 illustrates a coordinate system guide display and a tool path before and after being updated;

FIG. 5 illustrates a coordinate system guide magnification/reduction;

FIG. 7 is a flowchart illustrating the inputting of data for the coordinate system guide display system;

FIGS. 10(a) and 10(b) illustrate a workpiece coordinate system and a virtual coordinate system as used in a conventional numerical control apparatus;

DETAILED DESCRIPTION OF THE PREFERRED EMBODIMENTS

Figure 6A:
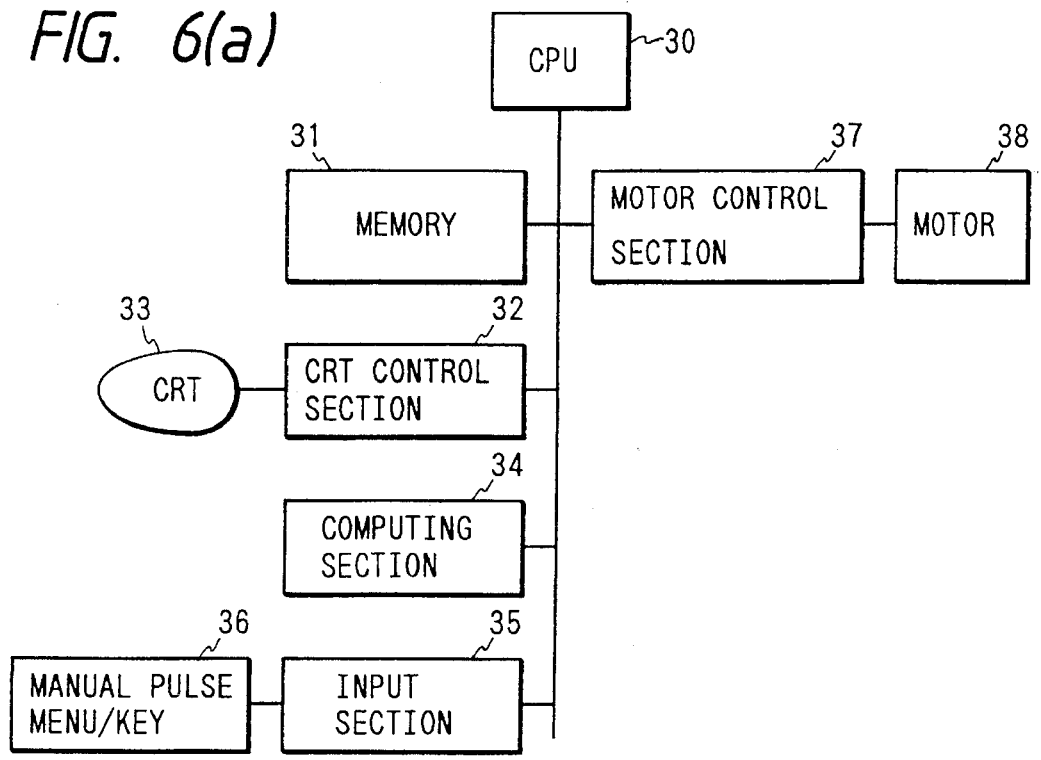
FIG. 6 represents a block diagram of a coordinate system guide display system.

With reference to FIG. 1, there is shown a coordinate system guide display. The display includes a cube 10 for providing a visual reference point, a menu frame 15, a screen frame 16, a display frame 17, a virtual coordinate system guide 20, and a virtual coordinate system guide display/ erase menu 21. A display format on the graphic display device is arranged, for example, as shown in FIG. 1, displaying necessary graphic information. The virtual coordinate system guide 20 is displayed/erased by selecting the virtual coordinate system guide display/erase menu 21 option. The shape of the virtual coordinate system guide 20, which is defined by X, Y, and Z axes and a box indicating an X,Y plane, is drawn after it has been coordinate-converted according to information relating to the virtual coordinate system 13. The virtual coordinate system 13 information includes translation values and rotation values of the X, Y, and Z axes relative to the workpiece coordinate system, which define the shape of the virtual coordinate system guide 20.

Referring to FIG. 2(a), an input device includes an axis select switch 18 for selecting an axis, and a manual pulse generator 19. When, for example, an axis A (here, X axis) is selected with the axis select switch 18 and a rotation is input by the manual pulse generator 19, the virtual coordinate system guide 20 is displayed correspondingly as shown in FIG. 2(b). Specifically, the movement of the manual pulse generator causes the virtual coordinate system guide 20 to rotate about the selected axis. FIG. 2(c) shows the whole coordinate system guide display.

FIG. 3 illustrates a coordinate system guide display with a tool path drawing menu 25 option selected. Both the tool path 26 and the virtual coordinate system guide 20 are displayed simultaneously by selecting both the tool path menu 25 option and the virtual coordinate system guide display/erase menu 21 option.

In FIG. 4, tool path 26A is displayed using a virtual coordinate system 13 set relative to the workpiece coordinate system 12. Virtual coordinate system 20A is parallel with workpiece coordinate system 12 in the X, Y, and Z directions. A tool path 26B is also shown from the same visual field in which tool path 26A is shown, with the virtual coordinate system 20B rotated about the X axis. Solid lines in the screen show what is currently displayed and broken lines show what was displayed before the rotation.

Referring now to FIGS. 5(a)–5(c), there is shown a tool path 26, a virtual coordinate system guide magnification/ reduction menu 23, and a visual field magnification/reduction menu 24. In FIG. 5(a), since the virtual coordinate system guide 20 is too large to be displayed within the display frame 17, the visual field magnification/reduction menu 24 is employed to magnify the visual field, which results in the display as shown in FIG. 5(b). However, as the visual field is magnified, the virtual coordinate system guide 20 is reduced accordingly and the shape of the virtual coordinate system guide 20 becomes disproportionate. Hence, the virtual coordinate system guide magnification/ reduction menu 23 is employed to magnify the virtual coordinate system guide 20 to that as shown in FIG. 5(c).

FIG. 6(a) is a block diagram of the numerical control apparatus which includes a CPU 30 and a memory 31 for storing virtual coordinate information 60 (see FIG. 7(b)), virtual coordinate system guide shape information 61, a virtual coordinate system guide display mode information 62, and magnification/reduction information 63. The apparatus also includes a CRT control section 32, a CRT 33 constituting a graphic display device in conjunction with the CRT control section 32, a computing section 34, an input section 35, inputting means such as a manual pulse generator 36, menus and keys, a motor control section 37, and a motor 38.

Figure 6B:
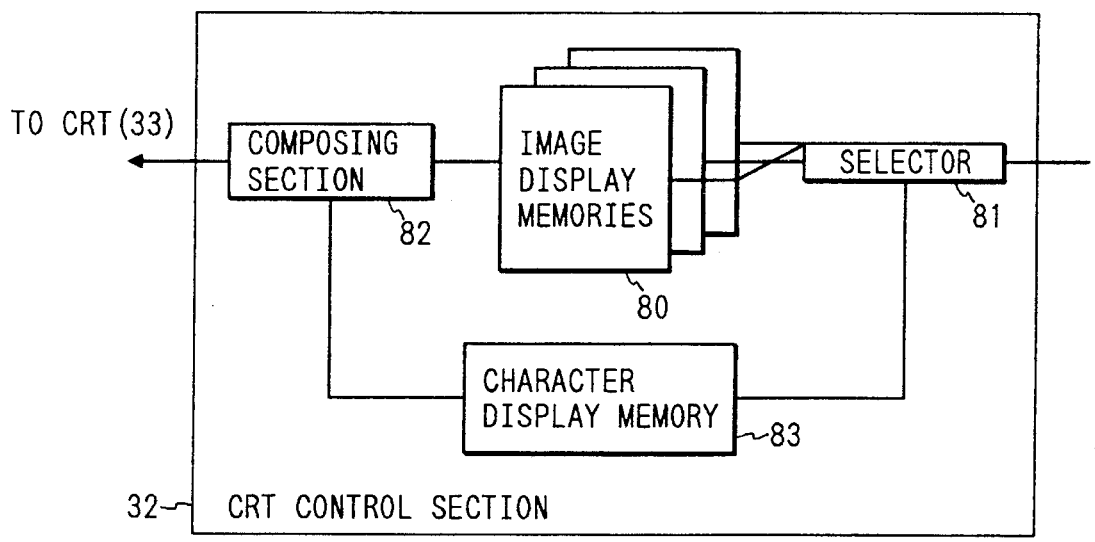

FIG. 6(b) is a block diagram of the CRT control section 32 which includes image display memories 80 for storing general shapes, such as tool paths, material shapes, and virtual coordinate shapes on a memory-by-memory basis, a character display memory 83, a selector for selecting the memories 80 and 83, a composing section for composing the data of the memories 80 and 83 and for displaying the composed data on the CRT 33.

The operation of the numerical control apparatus will now be described in accordance with the flowcharts shown in FIGS. 7(a) and 7(b) wherein reference numeral 60 indicates virtual coordinate information, numeral 61 designates virtual coordinate system guide shape information, numeral 62 designates virtual coordinate system guide display mode information, and numeral 63 represents magnification/reduction information, all of which are stored in the memory 31.

The information pertaining to the virtual coordinate system 13, which is stored in memory 31, may be input in two ways. First, the virtual coordinate system 13 information, which is described in a cutting program, may be input by the computing section 34. Second, the information may be input by the axis select switch 18 and the manual pulse generator 19 (FIG. 2(a)), which represent the inputting means 36 connected to the inputting section 35 of FIG. 6(a).

FIG. 7(a) shows a processing flowchart for the first information inputting method. In step 40, the cutting program is analyzed by the computing section 34 and then a determination is made in step 41 whether the virtual coordinate system 13 should be set. If the determination results in a record instruction, the virtual coordinate information 60 is recorded in step 42. Otherwise, the inputting process proceeds to the second inputting method which is shown in FIG. 7(b) and described below.

An interactive menu inputting section processing flowchart shown in FIG. 7(b) will now be described.

If the virtual coordinate system guide display/erase menu 21 is selected in step 43, the current coordinate system guide display mode is determined in step 44. If in the display mode, the mode is switched OFF and the processing is terminated in step 46. Otherwise, in step 45, the mode is switched ON and it is then determined whether the graphic of the virtual coordinate system guide 20 is present in step 47. If the graphic does not exist, a shape is drawn in step 48. As a result, the virtual coordinate system guide shape information 61 and the virtual coordinate system guide display mode 62 are set and stored in memory 31.

If the virtual coordinate system guide display/erase menu 21 is not selected in step 43 and the virtual coordinate system guide magnification/reduction menu 23 is selected in step 49, a magnification/reduction scale value is input by the keys of the inputting means 36 in step 50 and the input information is recorded as magnification/reduction information 63.

If the virtual coordinate system guide magnification/reduction menu 23 is not selected in step 49 and the manual pulse value has been updated in step 51, the corresponding axis and rotational values are calculated in step 52 and recorded as virtual coordinate information 60.

Figure 8:
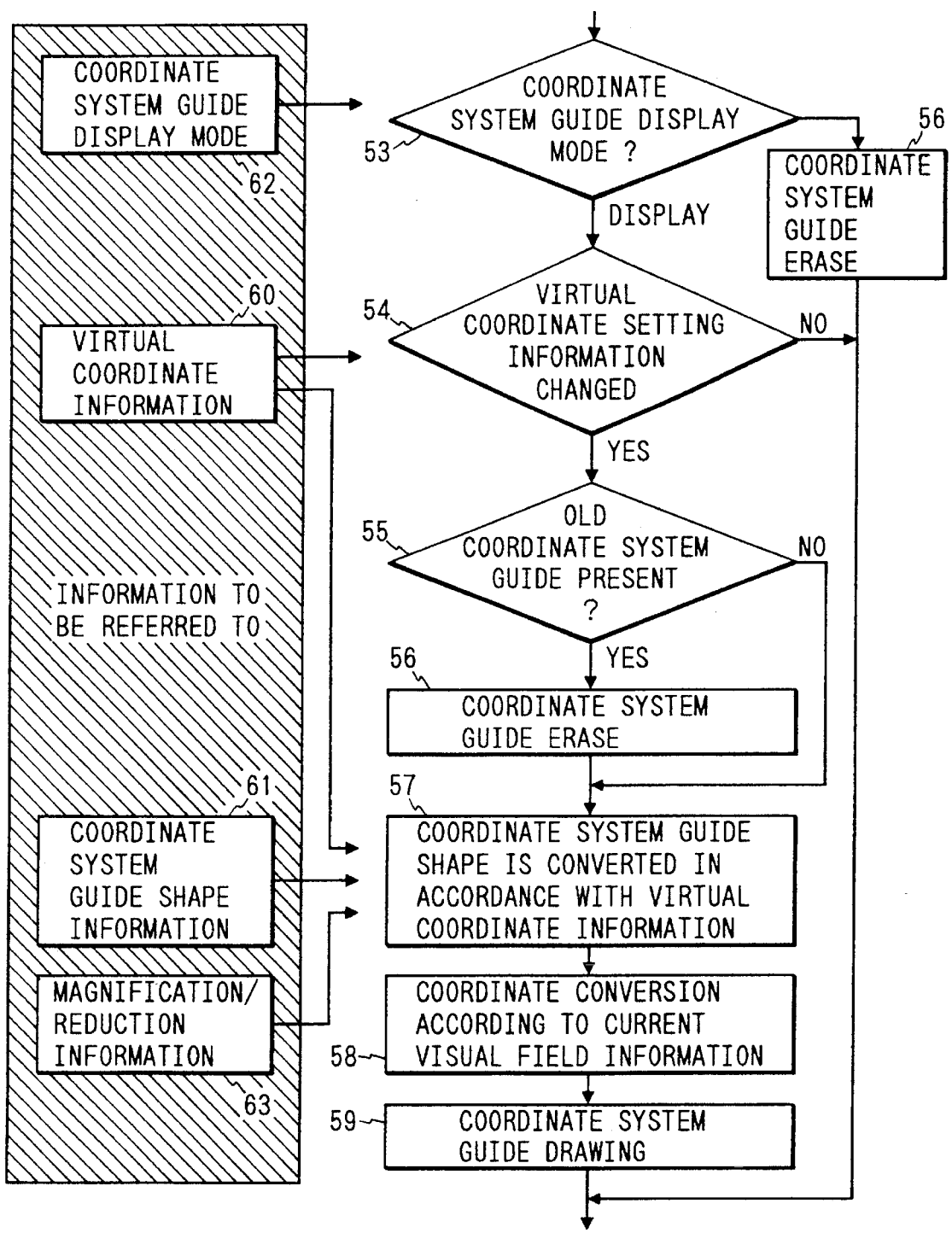
FIG. 8 is a flowchart illustrating the display of data for the coordinate system guide display of FIG. 1.

The virtual coordinate information 60, the virtual coordinate system guide shape information 61, the virtual coordinate system guide display mode 62 and the magnification/reduction information 63 set by the computing section 34 and the inputting section 35 are accessed while data is displayed as described in the flowchart of FIG. 8.

In FIG. 8, the virtual coordinate system guide display mode information 62 is checked in step 53. If an erase command is entered, the shape of the virtual coordinate system guide 20 is erased from the screen in step 56. Here, the hardware arrangement of the graphic display device in the present embodiment, as shown in FIG. 6(b), draws a shape by selecting one surface from the plurality of image memories 80 by means of the selector 81. Hence, the erasure of the virtual coordinate system guide 20 in step 56 is achieved by performing an erase operation after the required image memory 80, which stores the surface having the drawn virtual coordinate system guide 20, has been selected by the selector 81.

Referring back to step 53, if "display" is entered as the virtual coordinate system guide display mode information 62, the virtual coordinate information 60 is checked to see if it has been updated in step 54. If it has not yet been updated, the execution processing terminates. If it has already been updated, it is checked in step 55 whether the old virtual coordinate system guide 20 is present or not. If it is present, it is erased in step 56. Otherwise, the process proceeds to step 57.

In step 57, the coordinate conversion of the virtual coordinate system guide shape information 63, generated in the inputting section 35, is performed in step 57 by means of the parameters of the virtual coordinate system information 60. Specifically, shape translation, specified axis rotation, and magnification/reduction are processed.

Then, in step 58, coordinate conversion is made using current visual field information. The current visual field information is checked by using the cube 10 which serves as a visual reference point, and its parameters provided for image display control allow the display visual field to be magnified, reduced, and moved. Finally, when the shape of the virtual coordinate system guide 20 is stored into the image memory 80, it is composed together with other general shapes to be displayed such as the tool path, the information of the character display memory 83, in the composing section 82, and composed data is output to the CRT 33 and displayed on the CRT screen in step 59.

Figure 9:
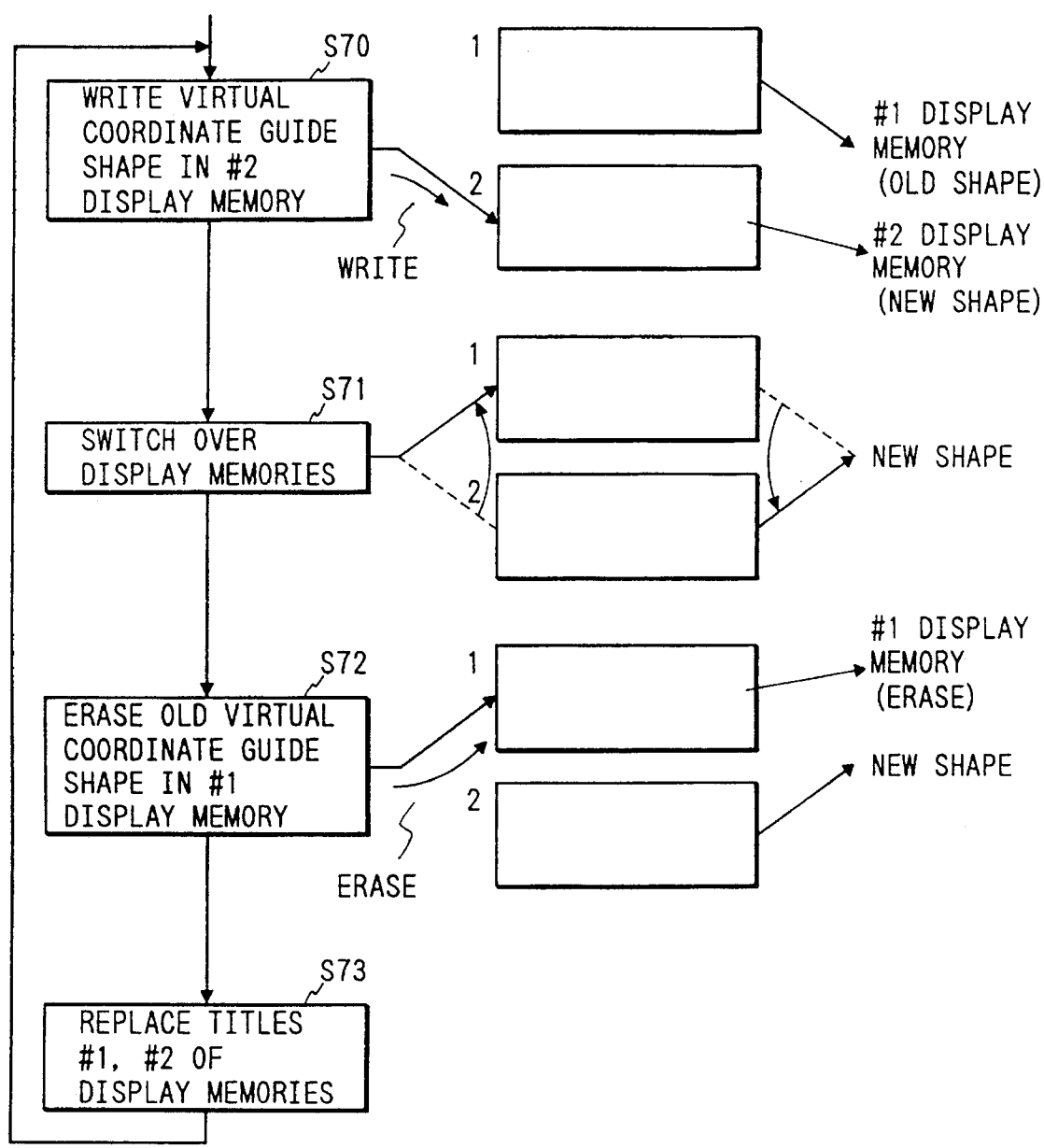
FIG. 9 is a flowchart illustrating the real-time operation of storing and retrieving coordinate system guide data.
Figure 11:
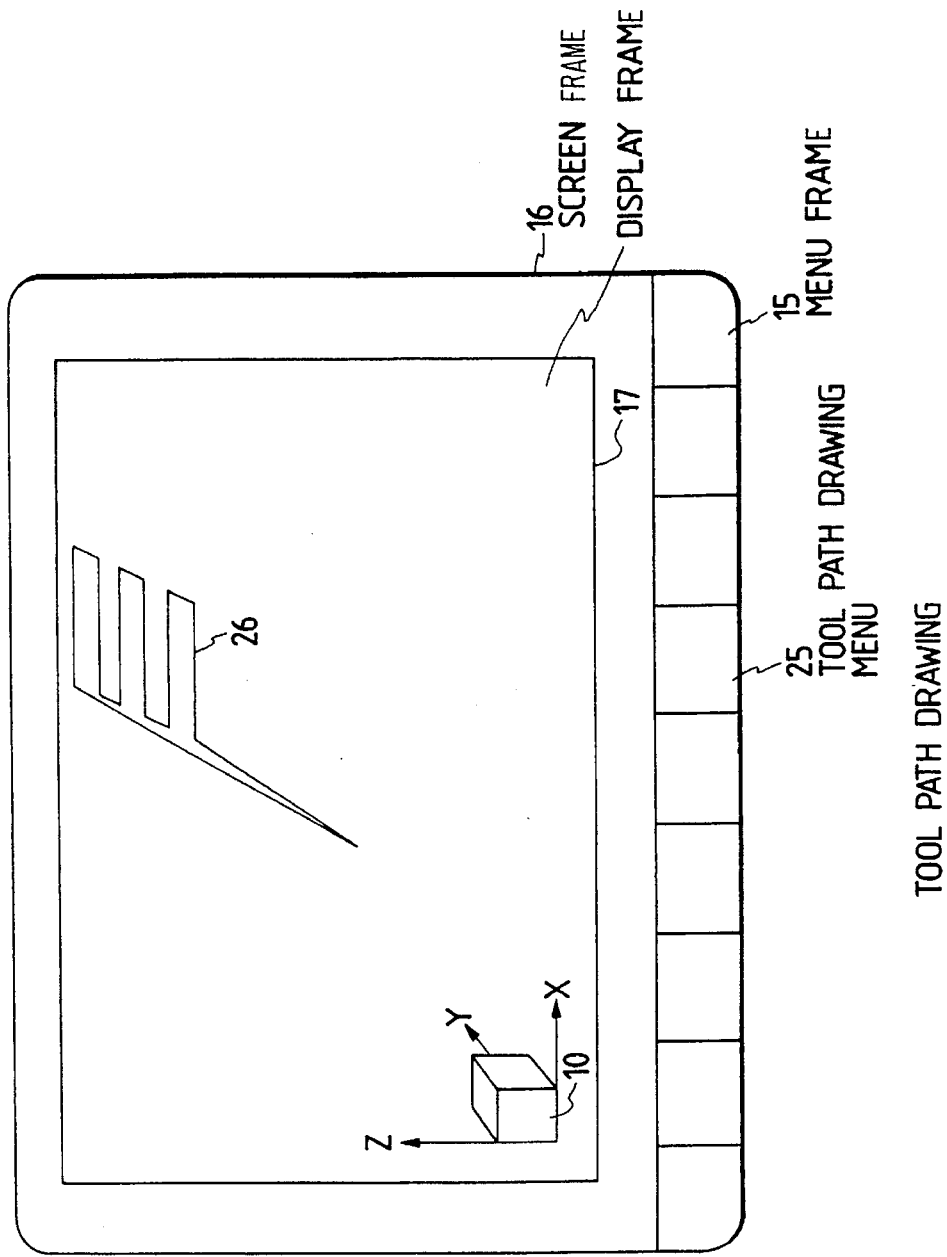
FIG. 11 illustrates a graphic device display of a conventional numerical control apparatus.
Figure 12:
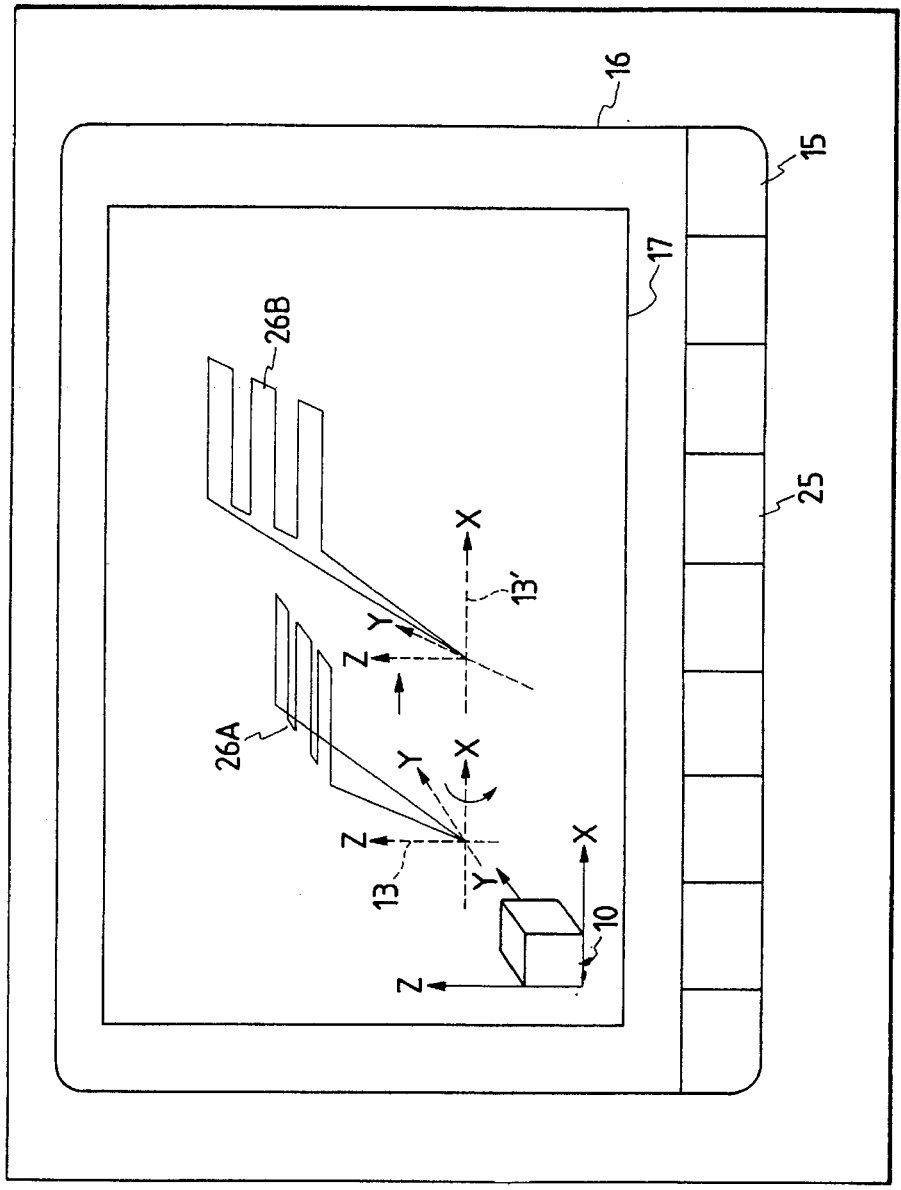
FIG. 12 illustrates a graphic device display of a conventional numerical control apparatus.

FIG. 9 illustrates the real-time display of the virtual coordinate system guide 20. Initially, a first display memory 80 contains the shape of a virtual coordinate system guide 20. In step 70, the shape of the virtual coordinate system guide 20 shape is updated and stored in a second of the display memories 80. Thus, the display memories 80 contain data representing the shape of the virtual coordinate system guide 20 before and after the updating process.

Next, in step 71, each display memory 80 is selected so that the virtual coordinate system guide 20 shape in the first display memory 80 (i.e., before updating) can be erased. At the same time, the virtual coordinate system guide 20 shape after updating, which is stored in the second display memory 80, is displayed by the selection circuit 81. At step 72, the virtual coordinate system guide 20 shape before updating which is stored in the first display memory 80 is erased. At step 73, the first and second titles of the display memories 80 are replaced.

It will be apparent that the invention, as described above, achieves a numerical control apparatus which, when a virtual coordinate system has been set, allows the setting status thereof to be checked visually on a graphic display device, whereby any wrong parameter, for example, for the virtual coordinate system commanded in a program can be found in advance. It will also be apparent that the invention achieves a numerical control apparatus which, when the axis of the virtual coordinate system has been selected by manual operation under a setup or other condition, allows the operation to be performed while simultaneously viewing the change of a virtual coordinate system guide, thereby ensuring that the intended operation can be carried out easily.

What is claimed is:

1. A numerical control apparatus for controlling a cutting machine for cutting a workpiece according to a predetermined tool path, the tool path being defined relative to a coordinate system by a cutting program, said numerical control apparatus comprising:

guide means for generating data representing a coordinate system guide;

a graphic display device for displaying said coordinate system guide so that an operator can determine whether the tool path is defined relative to a desired coordinate system;

means for inputting data representing a selected axis and a rotational value and for rotating a currently set virtual coordinate system in an amount corresponding to said rotational value about said selected axis to provide an updated virtual coordinate system;

means for updating and displaying in real-time on said graphic display device said coordinate system guide; and means for displaying data pertaining to the amount of change between said currently set and updated virtual coordinate system;

wherein said coordinate system guide comprises a representation of a virtual coordinate system, said virtual coordinate system being relative to a workpiece coordinate system whose origin represents a zero point relative to the workpiece.

2. A numerical control apparatus as defined in claim 1, further comprising means for displaying said coordinate system guide overlapped with general shapes, including the tool path, on said graphic display device.

3. A numerical control apparatus as defined in claim 1, further comprising means for displaying said virtual coordinate system guide overlapped with general shapes, including the tool path, on said graphic display device.

4. A numerical control apparatus as defined in claim 1, further comprising magnification/reduction inputting means for inputting magnification/reduction instructions to magnify or reduce the currently displayed coordinate system guide, independently of magnification/reduction of a visual field of said graphic display device.

5. A numerical control apparatus as defined in claim 1, wherein said graphic display device comprises means for selecting whether to display/erase said coordinate system guide from said graphic display device; and means for selecting whether to display/erase the tool path from said graphic display device.

6. A numerical control apparatus as defined in claim 1, further comprising means for displaying a cube for use as a visual reference of a workpiece coordinate system.

7. A numerical control apparatus for controlling a cutting machine for cutting a workpiece according to a predetermined tool path, the tool path being defined relative to a coordinate system by a cutting program, said numerical control apparatus comprising:

guide means for generating data representing a coordinate system guide;

a graphic display device for displaying said coordinate system guide so that an operator can determine whether the tool path is defined relative to a desired coordinate system; and a CRT control circuit comprising:
a plurality of image display memories for storing data representing coordinate system guides, general shapes, and tool paths;
a character display memory;
a selector for selecting one of the plurality of image display memories; and
a composing circuit for composing data from a selected image display memory and for outputting composed data to a CRT.

8. A numerical control apparatus as defined in claim 7, further comprising means for displaying said coordinate system guide overlapped with general shapes, including the tool path, on said graphic display device.

9. A numerical control apparatus as defined in claim 7, further comprising magnification/reduction inputting means for inputting magnification/reduction instructions to magnify or reduce the currently displayed coordinate system guide, independently of magnification/reduction of a visual field of said graphic display device.

10. A numerical control apparatus as defined in claim 7, wherein said graphic display device comprises means for selecting whether to display/erase said coordinate system guide from said graphic display device; and means for selecting whether to display/erase the tool path from said graphic display device.

11. A numerical control apparatus as defined in claim 7, further comprising means for displaying a cube for use as a visual reference of a workpiece coordinate system.

12. A method of controlling a cutting machine for cutting a workpiece according to a predetermined tool path in a numerical control apparatus, the tool path being defined relative to a coordinate system by a cutting program, said method comprising the steps of:

selecting whether to display/erase a coordinate system guide;

determining, if said coordinate system guide is to be displayed, whether data representing said coordinate system guide is stored in memory;

generating, if said data is not stored in memory, coordinate system guide data comprising virtual coordinate system guide shape information; and displaying said coordinate system guide on a display device based on said generated virtual coordinate system guide shape information.

13. A method as defined in claim 12, wherein said step of generating data comprises the step of inputting data representing selection of an axis of the coordinate system and a rotational value which said coordinate system guide is to be rotated about said selected axis.

14. A method as defined in claim 12, further comprising the step of displaying a representation of a coordinate system of said workpiece such that said representation and said virtual coordinate system guide are both visible.

15. A method as defined in claim 14, further comprising the step of adjusting a size of said virtual coordinate system guide to compensate for enlargement/reduction of a visual field as displayed on said display device.

16. A method of controlling a cutting machine for cutting a workpiece according to a predetermined tool path in a numerical control apparatus, the tool path being defined relative to a coordinate system by a cutting program, said method comprising the steps of:

generating data representing a coordinate system guide;

displaying said coordinate system guide on a graphic display device so that an operator can determine whether the tool path is defined relative to a desired coordinate system;

inputting data representing a selected axis and a rotational value;

rotating a currently set virtual coordinate system in an amount corresponding to said rotational value about said selected axis to provide an updated virtual coordinate system; and updating and displaying in real-time on said graphic display device said coordinate system guide; and displaying data pertaining to the amount of change between said currently set and updated virtual coordinate system;

wherein said coordinate system guide comprises a representation of a virtual coordinate system, said virtual coordinate system being relative to a workpiece coordinate system whose origin represents a zero point relative to the workpiece.

17. A method as defined in claim 16, further comprising the step of displaying said coordinate system guide overlapped with general shapes, including the tool path, on said graphic display device.

18. A method as defined in claim 16, further comprising the step of displaying said virtual coordinate system guide overlapped with general shapes, including the tool path, on said graphic display device.

19. A method as defined in claim 16, further comprising the step of inputting magnification/reduction instructions to magnify or reduce the currently displayed coordinate system guide, independently of magnification/reduction of a visual field of said graphic display device.

20. A method as defined in claim 16, further comprising the steps of:

selecting whether to display/erase said coordinate system guide from said graphic display device; and selecting whether to display/erase the tool path from said graphic display device.

21. A method as defined in claim 16, further comprising the step of:

displaying a cube for use as a visual reference of a workpiece coordinate system.

22. A method of controlling a cutting machine for cutting a workpiece according to a predetermined tool path in a numerical control apparatus, the tool path being defined relative to a coordinate system by a cutting program, said method comprising the steps of:

generating data representing a coordinate system guide;

displaying said coordinate system guide on a graphic display device so that an operator can determine whether the tool path is defined relative to a desired coordinate system;

storing data representing coordinate system guides, general shapes, and tool paths in a plurality of image display memories;

storing data representing characters in an image display memory;

selecting one of the plurality of image display memories;

composing data from a selected image display memory; and outputting composed data to a CRT.

23. A numerical control apparatus for controlling a cutting machine for cutting a workpiece according to a predetermined tool path, the tool path being defined relative to a coordinate system by a cutting program, said numerical control apparatus comprising:

means for selecting whether to display/erase a coordinate system guide;

means for determining, if said coordinate system guide is to be displayed, whether data representing said coordinate system guide is stored in memory;

means for generating, if said data is not stored in memory, coordinate system guide data comprising virtual coordinate system guide shape information; and means for displaying said coordinate system guide on a display device based on said generated virtual coordinate system guide shape information.

24. A numerical control apparatus as defined in claim 23, wherein said means for generating data comprises a means for inputting data representing selection of an axis of the coordinate system and a rotational value which said coordinate system guide is to be rotated about said selected axis.

25. A numerical control apparatus as defined in claim 23, further comprising a means for displaying a representation of a coordinate system of said workpiece such that said representation and said virtual coordinate system guide are both visible.

26. A numerical control apparatus as defined in claim 23, further comprising a means for adjusting a size of said virtual coordinate system guide to compensate for enlargement/reduction of a visual field as displayed on said display device.

* * * * *